Jan. 2, 1951

J. G. BURMIST 2,536,870

VIBROGRAPH

Filed Aug. 24, 1945

INVENTOR.
JOHN G. BURMIST
BY
*B. T. Wobensmith*
*attorney*

Jan. 2, 1951  J. G. BURMIST  2,536,870
VIBROGRAPH

Filed Aug. 24, 1945  2 Sheets-Sheet 2

INVENTOR.
JOHN G. BURMIST

Patented Jan. 2, 1951

2,536,870

UNITED STATES PATENT OFFICE 2,536,870

VIBROGRAPH

John G. Burmist, Philadelphia, Pa.

Application August 24, 1945, Serial No. 612,511

1 Claim. (Cl. 73—71)

This invention relates to vibrographs and more particularly to instruments for indicating and recording the amplitude, frequency, and character of vibrations of a body under test, the vibrations being resolved in three normal components, and indications thereof amplified and brought together in a single plane.

In accordance with the present invention, a vibrograph is provided, of a portable character, which is simple in its construction and reliable in its operation.

In accordance with the present invention, also, the components of vibration in normal planes are measured, indicated, and made available visually and with suitable magnification in one plane in an improved manner.

Other advantageous features will be apparent from the specification and claims.

The nature and characteristic features of the invention will be more readily understood from the following description taken in connection with the accompanying drawings forming part hereof, in which.

Figure 1:
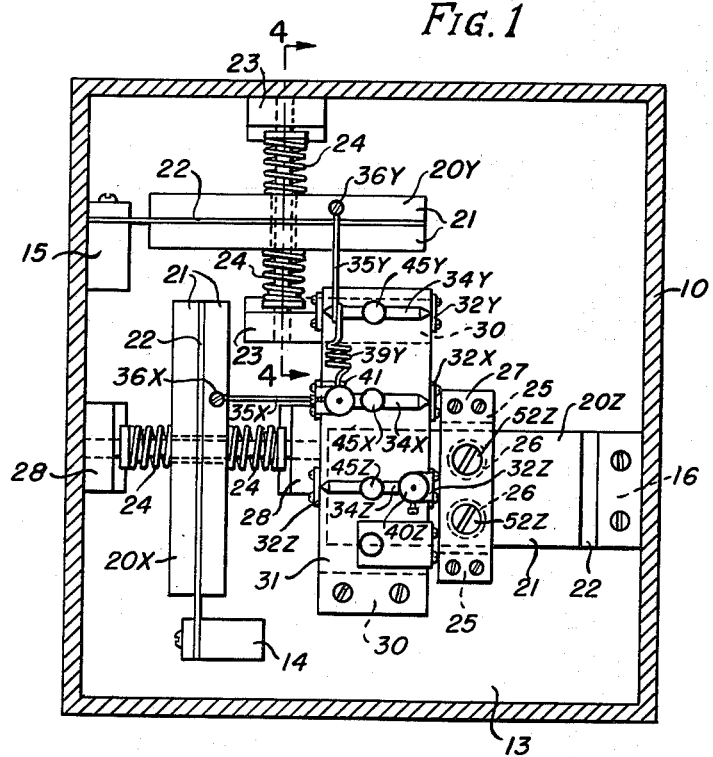
Figure 1 is a plan view of a vibrograph in accordance with the present invention, the housing being broken away to show the construction thereof.
Figure 2:
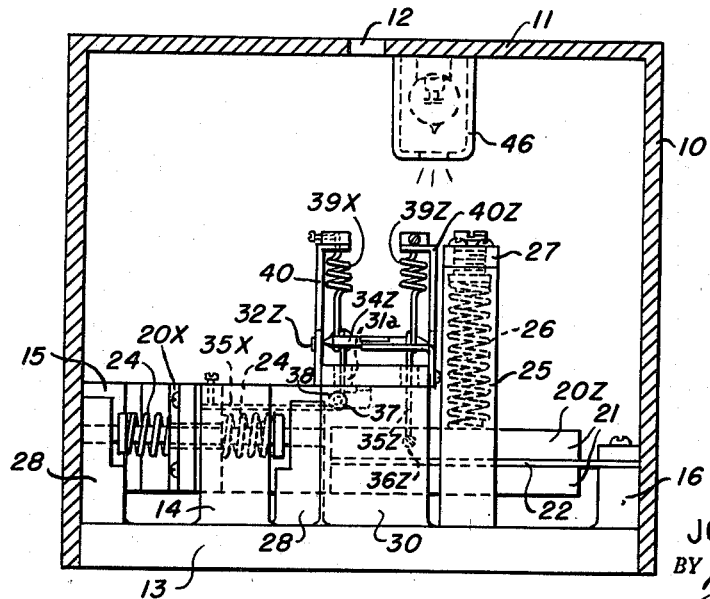
Fig. 2 is a front elevational view of the vibograph shown in Fig. 1, with the housing broken away.
Figure 3:
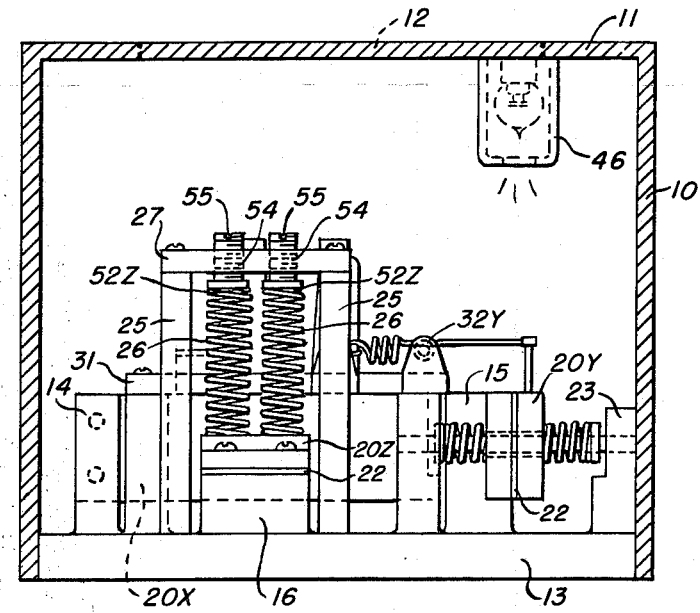
Fig. 3 is a side elevational view of the vibrograph shown in Fig. 1 with the housing broken away.
Figure 4:
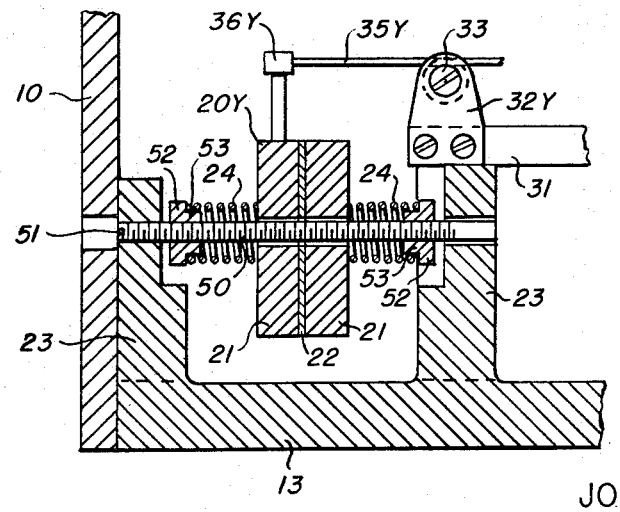
Fig. 4 is a fragmentary sectional view, enlarged, showing one of the vibratory elements in detail, and taken approximately on the line 4—4 of Fig. 1.

It should, of course be understood that the description and drawings herein are illustrative merely, and that various changes and modifications of the devices therein shown and described may be made without departing from the spirit of the invention, and further, that the invention may be embodied in a variety of other forms not herein specifically shown and described.

Referring more particularly to the drawings, an exterior housing 10 is provided, within which the movable parts of the vibrograph are carried and protected. The upper wall 11 of the housing 10 is provided with a slit or opening 12 and is adapted to carry thereon suitable photographic recording apparatus (not shown) for recording in one plane, indications of the components of vibrations, in the respective reference planes, of the body under test.

The vibrograph preferably includes a rigid base plate 13 of substantial mass. The base plate 13 has upstanding posts 14, 15 and 16, preferably formed integral therewith, the side faces of the posts 14 and 15 and the top face of the post 16 being adapted to support seismographic masses 20X, 20Y, and 20Z, each capable of, and restricted to, action in a plane. The masses 20X and 20Y are restricted to act in directions normal to each other, and these may be taken as indicative of X and Y components, respectively, and the mass 20Z is restricted to act in a direction normal to the masses 20X and 20Y, and this may be taken as indicative of a Z component. Each of the seismographic members 20X, 20Y and 20Z preferably consists of a pair of blocks 21, secured together in any desired manner, and with a flat spring 22 interposed and secured therebetween. The springs 22 are respectively secured to the posts 14, 15 and 16 and the distance between the blocks 21 and the posts 14, 15 and 16 is made short. The blocks 21 of the members 20X and 20Y may be of the same mass and the blocks 21 of the member 20Z of greater mass, the latter being subjected to the effect of the acceleration of gravity.

Pairs of spaced abutments 28 and 23 are provided on the base plate 13 and extend upwardly therefrom on opposite sides of the seismographic members 20X and 20Y and compression springs 24 of predetermined size and spring rate or spring constant are positioned between each of the seismographic members 20X and 20Y and the corresponding pairs of abutments 23 and 28. An abutment plate 27 is secured to posts 25 carried by the base 13 and coil springs 26, acting in compression, are interposed between the mass 20Z and the abutment plate 27.

Each of the seismographic systems comprising the blocks 21, the flat springs 22 and the compression springs 24 or 26, is preferably selected and proportioned so that the blocks 21 have suitable masses and the springs 22, 24 and 26 have suitable spring rates or spring constants to provide the desired natural period of oscillation of the respective systems. The spring rate or spring constant is the characteristic of a spring which is measured by the load necessary to produce a unit extension or compression of the spring. The effect of the springs 22 is relatively small, their purposes being primarily to provide a frictionless support and to restrict the action of the masses 20X, 20Y and 20Z to the desired direction and in the desired plane.

The natural period of oscillation of these systems is preferably considerably below the range of the vibrations to be studied, measured, and indicated or recorded. With a system having a natural period of vibration of the order of 202 oscillations per minute the instrument will be satisfactory for a range of the order of 450 to 25,000 oscillations per minute.

The base 13 is provided with a pair of posts 30 on which a horizontal spindle plate 31 is mounted. The plate 31 has pairs of upstanding brackets 32X, 32Y and 32Z in which jewels 33 are mounted to provide bearings for parallel spindles 34X, 34Y and 34Z.

The mass 20X is connected to the spindle 34X for actuating the same, and for this purpose a suitable connector 35X, which may consist of a wire of stainless steel of a cord of silk or rayon is provided. The connector 35X preferably extends from an adjustable stud 36X carried by the mass 20X, beneath a roller 37, mounted in a downwardly extending bracket 38 carried by the spindle plate 31, then upwardly through an opening 31a in the spindle plate 31, around the spindle 34X and to a tension spring 39X carried on a bracket 40 secured to the spindle plate 31.

The mass 20Y is connected to the spindle 34Y for actuating the same, and for this purpose a connector 35Y is provided. The connector 35Y is carried by an adjustable stud 36Y mounted in the mass 20Y and extends to and around the spindle 34Y and to a tension spring 39Y carried by a post 41 on the bracket 40.

The mass 20Z is connected to the spindle 34Z for actuating the same and the connector 35Z extends from an adjustable stud 36Z, to and around the spindle 34Z, and to a tension spring 39Z carried by a bracket 40Z which extends upwardly from and is carried by, the spindle plate 30.

Each of the spindles 34X, 34Y and 34Z is provided with a mirror 45X, 45Y and 45Z, respectively, preferably convex, for reflecting light from a suitable source 46, which preferably includes an electric lamp having a line filament, for reflection to the opening 12 for recording by the photographic apparatus or for visual observation.

In order to provide a suitable adjustment for zero setting of the mirrors 45X, and 45Y, a rod 50 is provided for each of the masses 20X and 20Y extending between the corresponding pairs of posts 23 and 28. The rods 50 are adapted for sliding movement in the posts 28 and 23 at the inner ends thereof, and the outer ends are slotted as at 51 for adjustment and are in threaded engagement with the outer posts 28 and 23. The rods 50 have threaded thereon spring abutments 52 which are adapted to be adjusted longitudinally on the rods 50 for adjustment and equalization of the force exerted by the springs 24. The spring abutments 52 have sleeves 53 extending into the ends of the springs 24. The rods 50 with the springs 24 in adjusted position may be moved by turning the same with a screwdriver in the end slots 51 to position the springs 24 and the masses 20X and 20Y therebetween to give the desired positioning of the mirrors 45X and 45Y.

The spring abutments 52Z for adjusting the springs 26 preferably have threaded extensions 54 in engagement with the abutment plate 27.

The spring abutments 52Z have end slots 55 for turning the spring abutments 52Z to adjust the springs 26.

With the mirrors 45X, 45Y, and 45Z adjusted to their zero positions, the vibrograph is positioned at the location where it is desired to investigate vibrations. Upon being subjected to vibrations, a relative movement is effected between the base 10 and the seismographic masses 20X, 20Y, and 20Z. The respective linear components of movement are transmitted through the connectors 35X, 35Y, and 35Z to the respective spindles 34X, 34Y, and 34Z and the light picked up by the mirrors 45X, 45Y, and 45Z from the light source 46 is reflected to the opening 12 for recording. The amplification of these linear components is effected by the use of the spindles 34 and the mirrors 45 and the spacing of the same from the opening 12. Each of the indications from the respective reference planes will be of equal intensity. The visible indication or record obtained in the photographic recording apparatus (not shown) may then be investigated in the usual manner to ascertain the amplitude, frequency, wave-form, and phase relationship of the respective components.

I claim:

In a vibrograph, an oscillatory system comprising a seismographic mass, a flat resilient member to which said mass is secured at one end, and additional resilient members, in combination with a base, a support for said flat resilient member secured to said base and to which the other end of the flat resilient member is rigidly secured for determining the plane of movement of the mass, a fixedly mounted abutment member secured to said base and intersecting the plane of movement of said mass, an adjustable supporting rod in screw threaded engagement with said abutment member and disposed in the plane of movement of said mass, said rod being movable along its longitudinal axis in said abutment member and extending through an opening in said mass, spaced holding members in threaded engagement with said supporting rod on opposite sides of said mass, said additional resilient members being mounted on said supporting rod in engagement with said holding members and with opposite sides of said mass, the natural period of oscillation of said oscillatory system being determined by the mass and by the spring constants of said resilient members.

JOHN G. BURMIST.

REFERENCES CITED

The following references are of record in the file of this patent:

UNITED STATES PATENTS

| Number | Name | Date |
|---|---|---|
| 1,522,175 | Campbell | Jan. 6, 1925 |
| 1,727,991 | Kimball, Jr. et al. | Sept. 10, 1929 |
| 1,869,828 | Shrader | Aug. 2, 1932 |
| 2,063,127 | Schnaitter | Dec. 8, 1936 |

FOREIGN PATENTS

| Number | Country | Date |
|---|---|---|
| 598,786 | Germany | June 18, 1934 |